United States Patent
You (12)

(10) Patent No.: US 6,477,155 B1
(45) Date of Patent: Nov. 5, 2002

(54) METHOD FOR DETERMINING THE NUMBER OF EFFECTIVE CHANNELS AND THE EFFECTIVE CHANNEL RATE IN A CDMA NETWORK

(75) Inventor: Byung-chul You, Scoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/262,659

(22) Filed: Mar. 4, 1999

(30) Foreign Application Priority Data

Mar. 4, 1998 (KR) .............................................. 98-7147

(51) Int. Cl.[7] .............................. H04Q 7/00; H04Q 7/20
(52) U.S. Cl. ...................... 370/331; 370/332; 370/335; 455/434; 455/442
(58) Field of Search ................................ 370/241, 254, 370/320, 321, 329, 331, 332, 335, 342, 397, 441; 455/676, 434, 436, 442, 453, 458, 464, 522

(56) References Cited

U.S. PATENT DOCUMENTS

5,267,261 A * 11/1993 Blakeney, II et al. ....... 370/331
6,216,004 B1 * 4/2001 Tiedemann, Jr. et al. ... 455/442
6,321,090 B1 * 11/2001 Soliman ..................... 455/440

* cited by examiner

*Primary Examiner*—Alpus H. Hsu
*Assistant Examiner*—Afsar M. Qureshi
(74) *Attorney, Agent, or Firm*—Dilworth & Barrese, LLP

(57) ABSTRACT

A method for determining the number of effective channels and the effective channel rate in a CDMA network is disclosed. The method calculates the ratio of the soft handoff area to the total service area and the soft handoff channel rate. The results are used to determine both the number of effective channels and the effective channel rate.

21 Claims, 5 Drawing Sheets

METHOD FOR DETERMINING THE NUMBER OF EFFECTIVE CHANNELS AND THE EFFECTIVE CHANNEL RATE IN A CDMA NETWORK

FIELD OF THE INVENTION

The present invention relates generally to communication systems, and in particular, to a method for calculating capacity variation and effective channel rate per sector in connection with the soft handoff rate in a CDMA network.

DESCRIPTION OF THE RELATED ART

Mobile communication networks and personal communication systems employing CDMA technology do not limit accommodation capacity to a fixed value, but rather, accommodate user flexibly in accordance with the constantly changing network environment. CDMA technology makes it possible for a mobile to maintain a simultaneous connection (i.e., occupy a radio link) with two or three base stations as it transitions between them. This process is referred to as soft handoff and represents an important characteristic of CDMA technology. However, one effect of soft handoffs is that the accommodation capacity of a CDMA network and base station varies in accordance with the soft handoff rate. A drawback of conventional cellular mobile communication networks is that call-drops frequently occur when a mobile station experiences a serious fading within a handoff area. To overcome this, CDMA technology utilizes soft handoffs to improve the percentage of successful handoffs in CDMA networks. Soft handoffs provide an additional advantage in eliminating audible "impulse" noises that are often heard in mobile stations during handoff procedures.

However, CDMA networks have other problems, in that network capacity is decreased by the soft handoff method employed. This is because a mobile station performing a soft handoff occupies two or three radio links at the same time and accordingly utilizes the capacity of two or three stations during this procedure. This means that the capacity of a CDMA network may vary according to the ratio of soft handoff areas in a network to total service area in a network or by the rate at which channels within base stations perform soft handoffs.

Conventional CDMA network design methods have used the terms "ratio of soft handoff area to total service area" and "soft handoff channel rate" interchangeably. For example, in conventional CDMA network design methods, the soft handoff channel rate is assumed to be 40% which has resulted in the ratio of the soft handoff area to the total service area also assumed to be 40%. Adopting these values decreases the call success rate over the whole network. The number of users who can communicate simultaneously is also reduced as the accommodation capacity of whole network is significantly reduced as compared with a conventional radio network design. Therefore, CDMA networks often require additional equipment to achieve the service quality that the network was designed for, or service quality can only be maintained with a smaller number of users than contemplated in the original system design.

Other examples of conventional CDMA network design approaches include U.S. Pat. No. 5,710,758 ("the '758 patent"). In the '758 patent, a method for simulating and analyzing the operation of a CDMA wireless network is described. In particular, an electronic representation of a wireless telecommunications system is configured for a given market area and the operation of that wireless telecommunications system simulated. An analysis of the reverse and forward links are performed to determine which locations within a demand and service vector will be able to establish reverse and forward links, respectively, with base stations placed at desired locations throughout the service area.

In contrast to the present invention, the '758 patent is directed to the design of a CDMA network and, as such, does not address accommodation capacity and/or the handoff rate.

SUMMARY OF THE INVENTION

The present invention provides a method for establishing and/or optimizing the handoff rate and accommodation capacity of a CDMA network by calculating capacity variation and effective channel rate per sector as a function of the soft handoff channel rate.

The soft handoff channel rate is used as a basis for determining the handoff rate and the accommodation capacity because it can be easily converted to a ratio of soft handoff area to the total service area. The ratio then readily confirms whether the target design value of accommodation capacity can be satisfied.

In accordance with a first aspect of the present invention, there is provided a method for determining the number of effective channels, and an effective channel rate in a code division multiple access network, comprising the steps of: calculating the ratio of the soft handoff area to the total service area, $H_{AT}$; calculating the soft handoff channel rate, $H_{CT}$ as a function $H_{AT}$; and determining the number of the effective channels, $N_{EFFECTIVE}$, and the effective channel rate, $R_{CH\text{-}EFFECTIVE}$, as a function of $H_{CT}$ and $H_{AT}$.

According to the method of the present invention, the ratio of the soft handoff area to the total service, $H_{AT}$ is related to $\Delta R$ and D such that $\Delta R = D \cdot (1 - \sqrt{1-H_{AT}})$, where $0 \leq H_{AT} \leq 1$ where R is a cell radius, D is a radius of coverage that the corresponding sector can service with the best signal quality, C is a radius of coverage that only the corresponding sector can service and $\Delta R$ is radius-difference between R and D or between C and D satisfying $0\ \Delta R\ D$.

In accordance with the present invention, $H_{AT}$, the ratio of the soft handoff area to the total service, is preferably calculated as the sum of $H_{A3}$ and $H_{A2}$ where $H_{A3}$ is the ratio of the 3-way soft handoff area in the total service area, and $H_{A2}$ is the ratio of the 2-way soft handoff area in the total service area.

$H_{A3}$ is preferably derived as a function of $H_{AT}$ as $H_{A3} = 2 \cdot (1-\sqrt{1-H_{AT}})^2$ and $H_{A2}$ is preferably derived as a function of $H_{AT}$ as $H_{A2} = H_{AT} - 2 \cdot (1-\sqrt{1-H_{AT}})^2$.

The soft handoff channel rate is preferably calculated as a function of $H_{AT}$ $$H_{CT} = \frac{4 \cdot (1 - \sqrt{1-H_{AT}})}{(2 - \sqrt{1-H_{AT}})^2}.$$

$H_{CT}$ is preferably calculated as the sum of $HC_3$ and $H_{C2}$, $H_{CT} = H_{C3} + H_{C2}$, where $H_{C3}$ is a 3-way handoff channel ratio for the total service area, and the $H_{C2}$ is a 2-way handoff channel ratio for the total service area.

The 3-way handoff channel ratio, $H_{C3}$ is related to $\Delta R$ and D such that $H_{C3} = 6 \cdot (AR)^2/(D+\Delta R)^2$, where R is a cell radius, D is a radius of coverage that the corresponding sector can service with the best signal quality, C is a radius of coverage that only the corresponding sector can service and $\Delta R$ is the radius-difference between R and D or between C and D satisfying $0\ \Delta R\ D$.

$H_{C2}$ is preferably derived as a function of $$H_{AT} : \frac{(1-\sqrt{1-H_{AT}})\cdot(6\cdot\sqrt{1-H_{AT}}-2)}{(2-\sqrt{1-H_{AT}})^2}.$$

The number of effective channels, $N_{EFFECTIVE}$ is preferably derived as $N_{EFFECTIVE}=N_{MAX}\cdot((1-H_{CT})+H_{C2}/2+H_{C3}/3)$, where
  $N_{MAX}$ is the maximum number of channels at a system loading environment defined in a practical system design,
  $H_{CT}$ is the handoff channel rate,
  $H_{C2}$ is the 2-way handoff channel ratio for the total service area and the $H_{C3}$ is the 3-way handoff channel ratio for the total service area.

In accordance with another aspect of the present invention, the number of effective channels, $N_{EFFECTIVE}$ is derived as a function of $$H_{AT} : N_{EFFECTIVE} = N_{MAX} \cdot \frac{1}{(2-\sqrt{1-H_{AT}})^2}.$$

In accordance with another aspect of the present invention, the effective channel rate, $R_{CH-EFFECTIVE}$ is derived as $R_{CH-EFFECTIVE}=(1-H_{CT})+H_{C2}/2+H_{C3}/3$, where $H_{CT}$ is handoff channel rate, $H_{C2}$ is 2-way handoff channel ratio for the total service area and, $H_{C3}$ is 3-way handoff channel ratio for the total service area.

In accordance with another aspect of the present invention, the effective channel rate, $R_{CH-EFFECTIVE}$ is derived as a function of $H_{AT}$, the ratio of the soft handoff area to the total service area:

$$R_{CH-EFFECTIVE} = \frac{1}{(2-\sqrt{1-H_{AT}})^2}.$$

A preferable embodiment of the method of the present invention for designing a CDMA communication system includes:
  (a) calculating the number of effective channels, $N_{EFFECTIVE}$ as $N_{EFFECTIVE}=N_{MAX}\cdot((1-H_{CT})+H_{C2}/2+H_{C3}/3)$, where:
    $N_{MAX}$ is the maximum number of channels that can reasonably be accommodated in a realizable CDMA communication system
    $H_{CT}$ is handoff channel rate,
    $H_{C2}$ is the 2-way handoff channel rate for the total service area and
    $H_{C3}$ is the 3-way handoff channel rate among total service area;
  (b) calculating the effective channel rate, $R_{CH-EFFECTIVE}=(1-H_{CT})+H_{C2}/2+H_{C3}/3$.

A preferable embodiment of the present invention of the method for optimizing the CDMA network in the CDMA digital mobile communication system includes:
  (a) calculating the number of effective channels, $N_{EFFECTIVE}$ as a function of $H_{AT}$ such that $$N_{EFFECTIVE} = N_{MAX} \cdot \frac{1}{(2-\sqrt{1-H_{AT}})^2},$$

were the $N_{MAX}$ is the maximum number of channels at a system loading environment defined in a practical system design, and $H_{AT}$ is a ratio of the soft handoff area to the total service; and
  (b) calculating the effective channel rate, $R_{CH-EFFECTIVE}$ as a function of $H_{AT}$ as $$R_{CH-EFFECTIVE} = \frac{1}{(2-\sqrt{1-H_{AT}})^2}.$$

In accordance with another embodiment of the present invention, there is provided a method for designing a CDMA network, comprising the steps of determining the area that the CDMA network is intended to service; arbitrarily selecting one or more base stations for use in the CDMA network and a transmission power for each selected base station; calculating radius values R, C and D from the transmission power of each base station and predetermined network parameters; calculating the number of base stations required for the network based on said determined area and radius values; calculating values for $N_{EFFECTIVE}$, $R_{CH-EFFECTIVE}$, $H_{AT}$ and $H_{CT}$ for the CDMA network; if the values for $N_{EFFECTIVE}$, $R_{CH-EFFECTIVE}$, $H_{AT}$ and $H_{CT}$ fall within pre-established target value bounds, ending the design process; otherwise, adjusting at least one of: the placement of the base stations, the transmission power, and the network parameters, and re-calculating values for $N_{EFFECTIVE}$, $R_{CH-EFFECTIVE}$, $H_{AT}$ and $H_{CT}$.

Preferably, said step of adjusting comprises the steps of: choosing a value for at least one of $N_{EFFECTIVE}$, $R_{CH-EFFECTIVE}$, $H_{AT}$ and $H_{CT}$ that falls within the pre-established target value bounds; calculating values for $N_{EFFECTIVE}$, $R_{CH-EFFECTIVE}$, $H_{AT}$ and $H_{CT}$ if values were not predetermined; if said values for $N_{EFFECTIVE}$, $R_{CH-EFFECTIVE}$, $H_{AT}$ and $H_{CT}$ do not fall within the target bounds, returning to said choosing step; otherwise calculating radius values for R, C and D to satisfy the values for $N_{EFFECTIVE}$, $R_{CH-EFFECTIVE}$, $H_{AT}$ and $H_{CT}$; and adjusting at least one of: the placement of the base stations, the transmission power, and the network parameters, and re-calculating values for $N_{EFFECTIVE}$, $R_{CH-EFFECTIVE}$, $H_{AT}$ and $H_{CT}$.

DESCRIPTION OF THE PREFERRED EMBODIMENTS

It is to be appreciated that conventional CDMA network design uses the terms "ratio of the soft handoff area to the total service area" and "soft handoff channel rate" interchangeably. The present invention, by contrast, establishes and/or optimizes the handoff rate and accommodation capacity by providing distinctly different definitions for each of the aforesaid terms.

Figure 1:
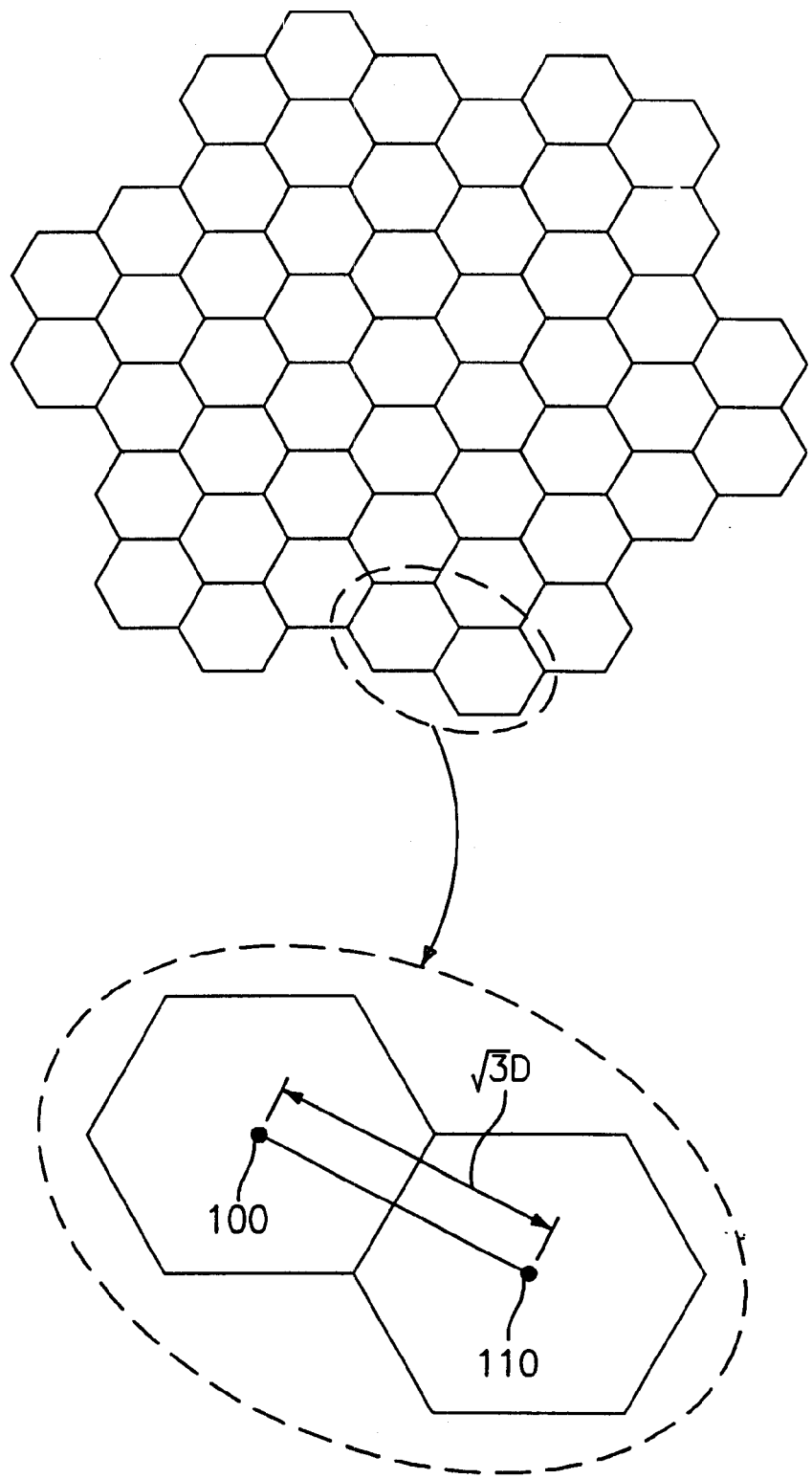
FIG. 1 illustrates the location and shape of BTSs (Base Transceiver Systems) according to one embodiment of the present invention.
Figure 2:
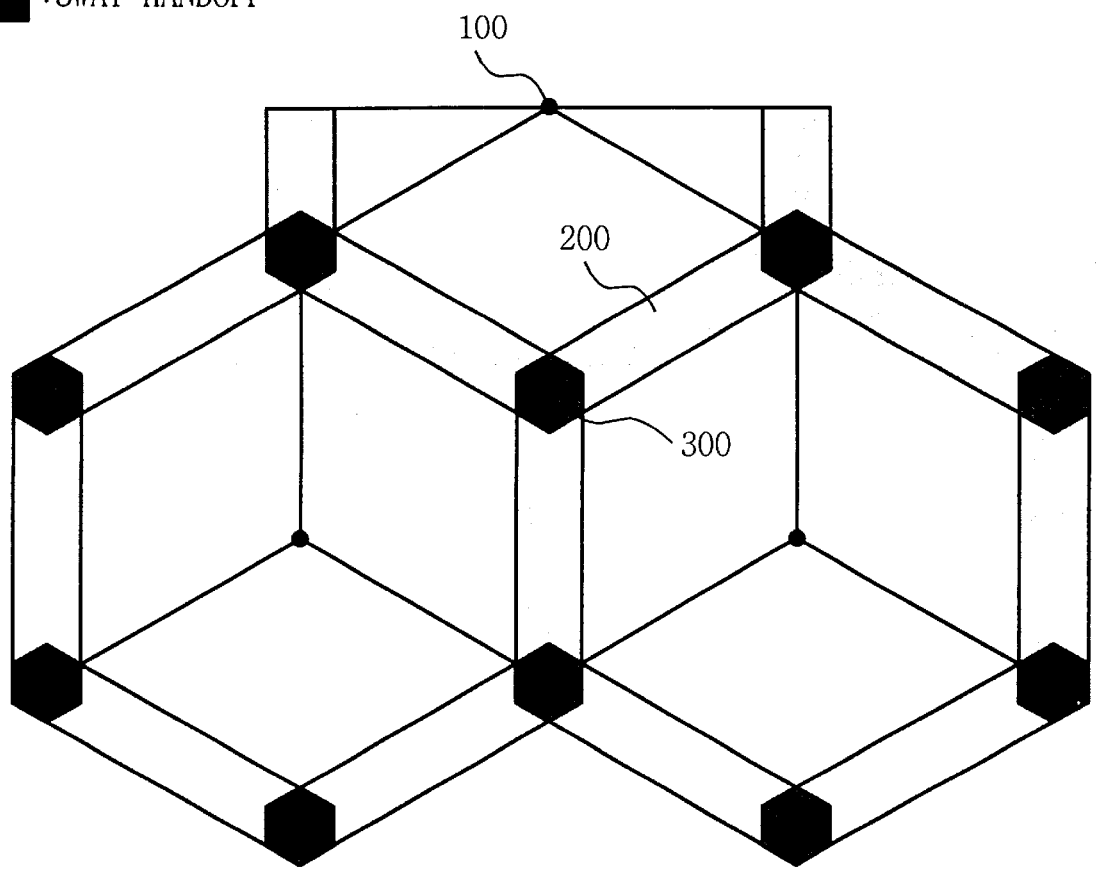
FIG. 2 illustrates a handoff-expected area in accordance with an embodiment of the present invention.
Figure 3:
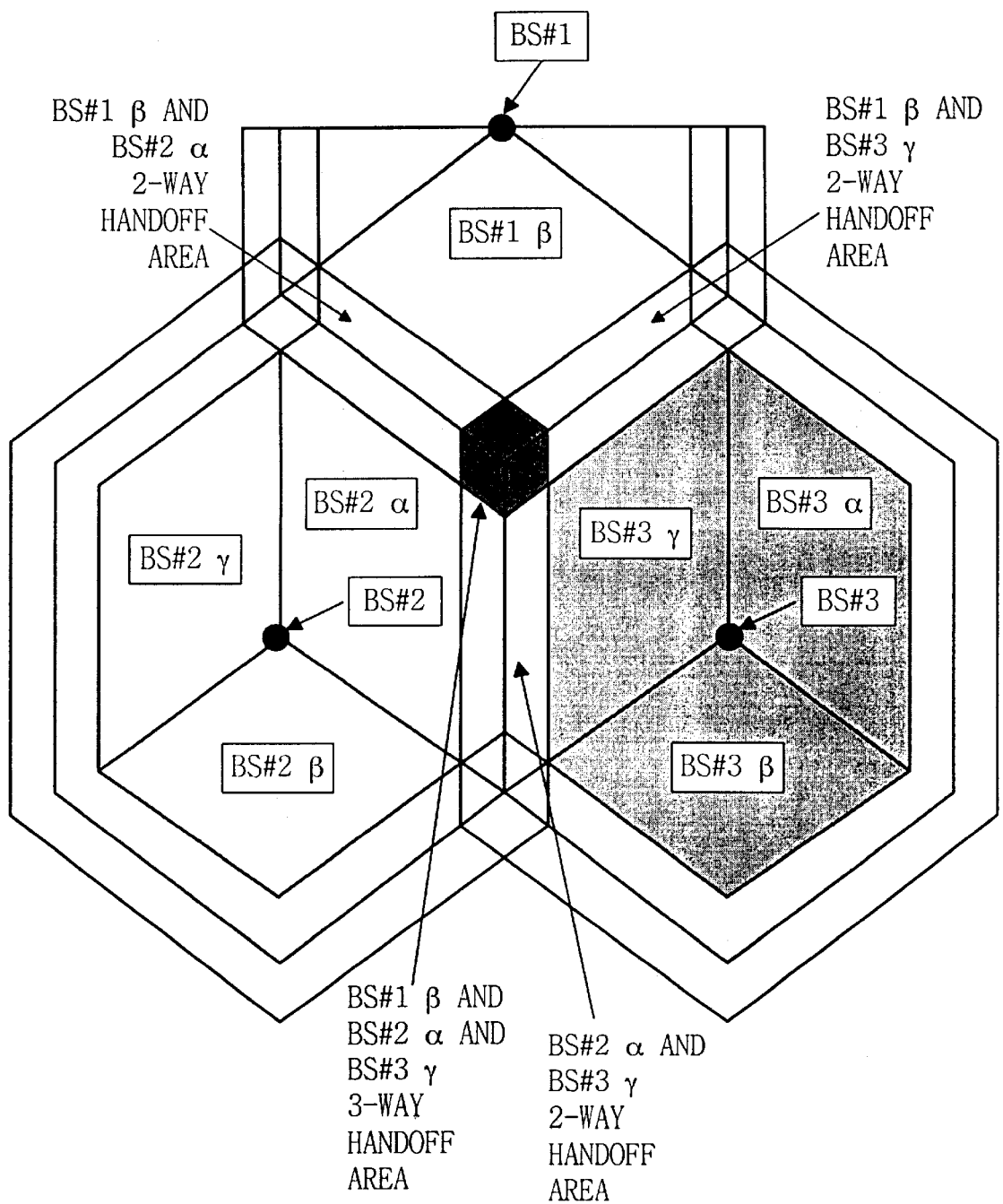
FIG. 3 illustrates detailed areas for all sectors in accordance with the embodiment of the present invention.

Referring to FIG. 1, a Base Transceiver System (BTS) is illustrated. Each base station 100 is ideally located within a predefined distance, √3D of its neighboring base station 110. Cells are defined to be regular non-overlapping hexagonal cells. Each base station is further presumed to have the same sector-directionality, effective radiated power (ERP) and path loss characteristics, and users are presumed to be uniformly distributed in the service area.

The following terms are defined to assist in the understanding of the present invention.

(1) the ratio of the soft handoff area represents a ratio of soft handoff to the total service area. Soft handoffs encompass both 2-way and 3-way handoffs 200, 300 respectively and a unique ratio can be calculated for each one.

(2) soft handoff channel rate $H_{CT}$: represents a ratio of traffic channels being connected to a mobile station in a soft handoff to total traffic channels of a base station or sector. The handoff encompasses 2-way and 3-way handoffs, respectively. Further, a separate ratio can be calculated for each one.

(3) effective number of users T': represents the maximum number of traffic channels that a sector or omni base station can supply. If it is assumed that N base station shaving the same configuration, are capable of accommodating a maximum number of users, T, the total number of users that can be accommodated in the whole network is theoretically calculated as N*T. This result is true for the advanced mobile phone service system (AMPS), however, due to the soft handoff characteristic of CDMA technology, the effective number of user, T' is defined such that it represents the effective total number of users who can be accommodated in the whole network as N by T'.

(4) effective number of channels represents a ratio of traffic channels being able to accommodate users to the effective number of users, T'.

(5) effective channel rate it is defined as T/T'.

The following terms are also defined to provide a complete understanding of the present invention.

Figure 4:
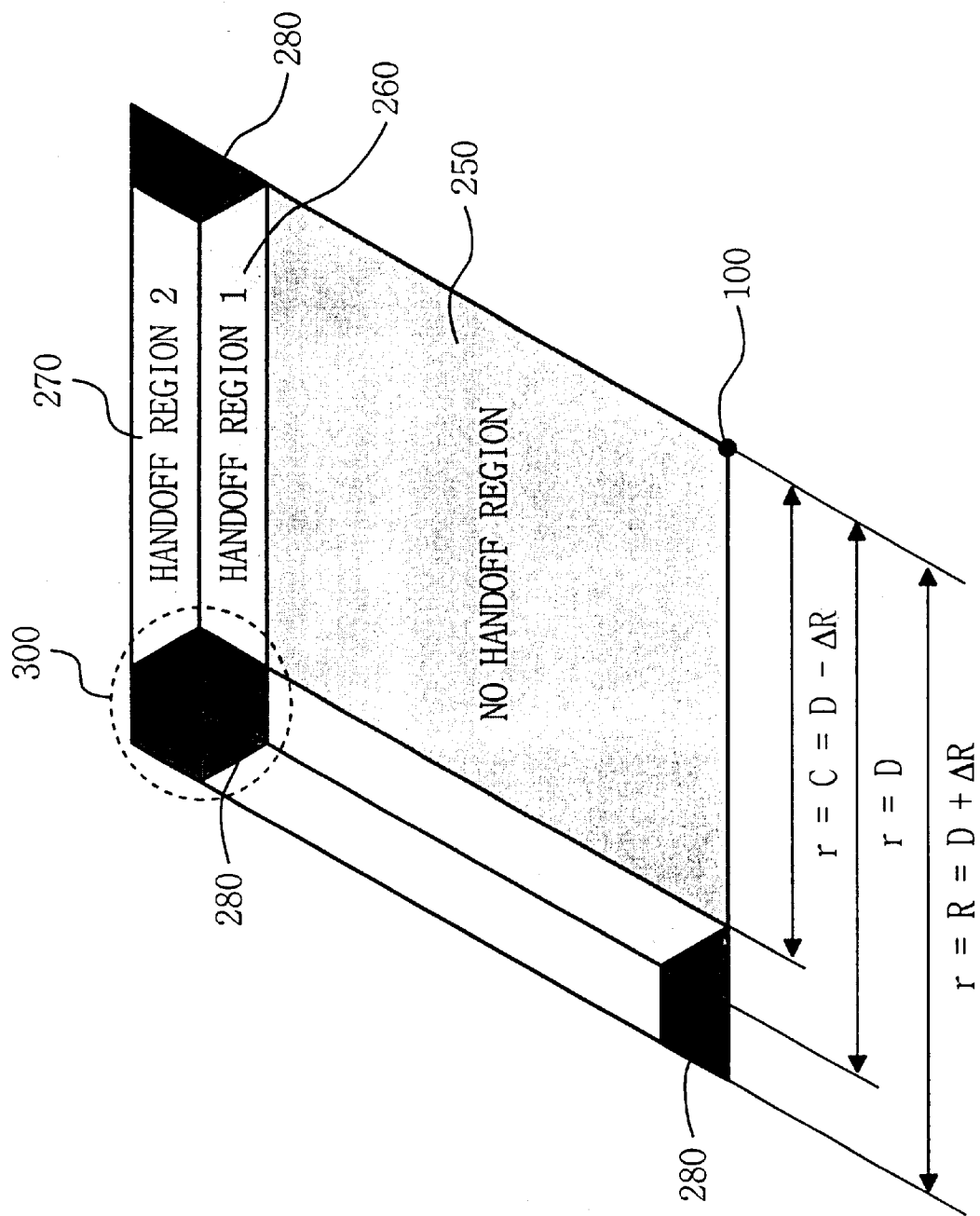
FIG. 4 illustrates the detailed area and radius for each sector in accordance with an embodiment of the present invention.

R: radius of coverage in which a sector can provide services [FIG. 4];

D: radius of coverage in which a specific sector can provide services with the highest signal quality [FIG. 4];

C: radius in which only a specific sector can provide services [FIG. 4];

ΔR: radius-difference between R and D or between C and D [FIG. 4];

M: the number of base stations within the total service area;

$H_{AT}$: the ratio of the soft handoff area to the total service area;

$H_{A2}$: the ratio of the 2-way handoff area to total service area;

$H_{A3}$: the ratio of the 3-way handoff area to total service area;

$$H_{AT} = H_{A2} + H_{A3} \quad \text{[Eqn. 1]}$$

$H_{CT}$: total handoff channel rate;
$H_{C2}$: 2-way handoff channel rate;
$H_{C3}$: 3-way handoff channel rate;

$$H_{CT} = H_{C2} + H_{C3} \quad \text{[Eqn. 2]}$$

$A_R$: service area for the radius, R (it corresponds to the diamond-shape in FIG. 4 as the sum of 'No Handoff Region" 250, 'Handoff Region 1' 260 and 'Handoff Region 2' 270);

$A_D$: service area for the radius, D (it corresponds to the diamond-shape sum of 'No Handoff Region" 250 and 'Handoff Region 1' 260);

$A_C$: service area for the radius, C (it corresponds to the diamond-shape of 'No Handoff Region" 250);

$A_\Delta$: 3-way handoff area for ΔR within radius, D (it corresponds to 3-way handoff area 280 within 'Handoff Region 1' 260)

$N_{POLE}$: pole capacity;
$N_{MAX}$: maximum number of sector channels;
$N_{EFFECTIVE}$: number of effective channels;
$R_{CH-EFFECTIVE}$: effective channel rate;
$F_r$: reverse link frequency reuse efficiency;
$E_s$: sectorization efficiency;
W: spreading bandwidth;
$R_b$: data rate;
$E_b$: average energy per bit;
$N_o$: noise density;
$X_{LOADING}$: a coefficient indicating system load status with range [0–1];
v: voice activity.

The first embodiment is directed towards a method for determining the effective number of channels and the effective channel rate in a CDMA network, first outlined and then described below.

OUTLINE

1. Calculating the Ratio of Soft Handoff Area to the Total Service Area of a Network 1.1 calculation of radius difference, ΔR for use in calculating the ratio of soft handoff area of the CDMA network 1.2 calculation of the ratio of the 2-way and 3-way handoff area to the total service area 2. Soft handoff channel rate 2.1 relation of the rate of the soft handoff area to the total service area and soft handoff channel rate 2.2 2-way and 3-way soft handoff channel rate 3. Number of effective channels according to handoff rate 3.1 equation for calculating pole capacity and maximum number of sector channels 3.2 number of effective channels per sector according to soft handoff channel rate 3.3 number of effective channels and effective channel rate according to the ratio of soft handoff area to total service area.

OUTLINE STEPS DEFINED

Step 1. Calculating the rate of soft handoff area to the total service area

Step 1.1 calculation of radius-difference, ΔR according to the rate of the soft handoff area to the total service area, $H_{AT}$. See Eqn. 4.

Referring to FIG. 4, the area of each region $A_R$, $A_D$, $A_C$ and $A_\Delta$ is calculated as follows:

$$A_R = \frac{\sqrt{3}}{2}R^2,$$

-continued $$A_D = \frac{\sqrt{3}}{2} D^2,$$

$$A_C = \frac{\sqrt{3}}{2} C^2,$$

$$A_\Delta = \sqrt{3} (\Delta R)^2.$$

If the number of base stations within the total service area, M is sufficiently large, the ratio of the soft service area to the total service area, $H_{AT}$ may be represented by the following approximate equation.

$$H_{AT} = \frac{TotalHandoffArea}{TotalServiceArea}$$

$$= \frac{TotalServiceArea - TotalNoHandoffArea}{TotalServiceArea}$$

$$\approx 1 - \frac{3 \cdot M \cdot A_C}{3 \cdot M \cdot A_D} = 1 - \frac{2 \cdot D \cdot (\Delta R) - (\Delta R)^2}{D^2}$$

Solving for radius-difference, $\Delta R$ from the above equation, it is possible to find roots as follows:

$$(\Delta R)^2 - 2 \cdot D \cdot (\Delta R) + H_{AT} \cdot D^2 = 0 \quad \text{[Eqn. 3]}$$

$$\Delta R = D \cdot \left(1 \pm \sqrt{1 - H_{AT}}\right)$$

However, equation 3 must satisfy the conditions, $0 \leq H_{AT} \leq 1$ and $0 \Delta R D$, so a root satisfying the above conditions is found as follows.

$$\Delta R = D \cdot \left(1 - \sqrt{1 - H_{AT}}\right) \quad \text{[Eqn. 4]}$$

Step 1.2 Calculation of the ratio of the 2-way and 3-way handoff areas within the total service area The ratio of the 3-way handoff area to the total service area may be represented as the following approximate equation if the number of base stations within the total service area, M is sufficiently large.

$$H_{A3} = \frac{Total3 - wayHandoffArea}{TotalServiceArea} \quad \text{[Eq. 5]}$$

$$\approx 1 - \frac{3 \cdot M \cdot A_\Delta}{3 \cdot M \cdot A_D} = 1 - \frac{A_\Delta}{A_D} = \frac{2 \cdot (\Delta R)^2}{D^2} \quad \text{[Eq. 6]}$$

The ratio of the 3-way handoff area to total service area, $H_{A3}$, may be represented as Eqn. 7 by substituting the result of Eqn. 4 into Eqn. 6.

$$H_{A3} = \frac{2 \cdot D^2 \cdot \left(1 - \sqrt{1 - H_{AT}}\right)^2}{D^2} = 2 \cdot \left(1 - \sqrt{1 - H_{AT}}\right)^2 \quad \text{[Eqn. 7]}$$

The ratio of the 2-way handoff area to total service area, $H_{A2}$ may be represented as Eqn. 8 by substituting the result of Eqn. 7 into Eqn. 1.

$$H_{A2} = H_{AT} - H_{A3} = H_{AT} - 2 \cdot \left(1 - \sqrt{1 - H_{At}}\right)^2 \quad \text{[Eqn. 8]}$$

Consequently, when the ratio of soft handoff area to the total service area is used as a basis of network design optimization, the 2-way and 3-way ratios can be calculated respectively with Eqn. 7 and Eqn. 8.

Step 2 Soft handoff channel rate

The soft handoff channel rate, HC, as defined above can be expressed in terms of the ratio of soft handoff area to the total service area of the network. By expressing the soft handoff channel rate in such a way, it is possible to accurately optimize either the number of users accommodated by the CDMA network or the minimum number of base stations required by the network.

Step 2.1 Relation of the ratio of the soft handoff area to the total service area, $H_{AT}$, to soft handoff channel rate, $H_{CT}$ The soft handoff channel rate may be represented according to the following equation:

$$H_{CT} = \frac{SectorHandoffArea}{SectorServiceArea} \quad \text{[Eqn. 9]}$$

$$= \frac{SectorServiceArea - SectorNoHandoffArea}{SectorServiceArea}$$

$$= 1 - \frac{A_C}{A_R} = 1 - \frac{C^2}{R^2} = 1 - \frac{(D - \Delta R)^2}{(D + \Delta R)^2} = \frac{4 \cdot D \cdot (\Delta R)}{(D + \Delta R)^2}$$

Equation 10 below illustrates the relation between the soft handoff channel rate, $H_{CT}$, and the ratio of the soft handoff area to the total service area, $H_{AT}$, Equation 10 is derived by substituting the result of Eqn. 4 into Eqn. 9 above.

$$H_{CT} = \frac{4 \cdot D \cdot (\Delta R)^2}{(D + \Delta R)^2} = \frac{4 \cdot D^2 \cdot \left(1 - \sqrt{1 - H_{AT}}\right)}{D^2 \cdot \left(1 + \left(1 - \sqrt{1 - H_{AT}}\right)\right)^2} \quad \text{[Eqn. 10]}$$

$$= \frac{4 \cdot \left(1 - \sqrt{1 - H_{AT}}\right)}{\left(2 - \sqrt{1 - H_{AT}}\right)^2}$$

Applying CDMA generally accepted values to Eqn. 10, a soft handoff channel rate may be computed. For example, setting the ratio of soft handoff area to total service area, $H_{AT}$, at 40%, a soft handoff channel rate, $H_{C7}$, is computed as:

$$H_{CT} = \frac{4 \cdot \left(1 - \sqrt{1 - H_{AT}}\right)}{\left(2 - \sqrt{1 - H_{AT}}\right)^2} = \frac{4 \cdot \left(1 - \sqrt{1 - 0.4}\right)}{\left(2 - \sqrt{1 - 0.4}\right)^2} = \frac{0.9016}{1.5016} = 0.6004$$

Namely, if $H_{AT}$, ratio of the soft handoff area to the total service area is 40%, the soft handoff channel rate of a sector or base station, $H_{CT}$ is calculated to be 60%. Therefore, for the example shown, it is to be appreciated that calls over only 40% of the total number of channels of a sector are maintained with a 'No handoff' status while calls over the remaining 60% of channels are maintained with either '2-way' or '3-way' soft handoff status.

Step 2.2 2-way and 3-way soft handoff channel rate

A 3-way soft handoff channel rate, $H_{C3}$, can be calculated for the soft handoff channel rate of Eqn. 10 by using the following equation:

$$H_{C3} = \frac{Sector3 - wayHandoffArea}{SectorServiceArea} = \quad \text{[Eqn. 11]}$$

$$\frac{3 \cdot A_\Delta}{A_R} = \frac{6 \cdot (\Delta R)^2}{R^2} = \frac{6 \cdot (\Delta R)^2}{(D + \Delta R)^2}$$

Substituting Eqn. 4 into Eqn. 10, it is possible to relate, $H_{C3}$, the 3-way soft handoff channel rate to the ratio of the soft handoff area to the total service area as:

$$H_{C3} = \frac{6 \cdot D^2 \cdot \left(1 - \sqrt{1-H_{AT}}\right)^2}{D^2 \cdot \left(1 + \left(1 - \sqrt{1-H_{AT}}\right)\right)^2} = \frac{6 \cdot \left(1 - \sqrt{1-H_{AT}}\right)^2}{\left(2 - \sqrt{1-H_{AT}}\right)^2} \quad \text{[Eqn. 12]}$$

Substituting Eqn. 12 into Eqn. 2, it is possible to represent the 2-way soft handoff channel rate as:

$$H_{C2} = H_{CT} - H_{C3} = \frac{4 \cdot \left(1 - \sqrt{1-H_{AT}}\right)}{\left(2 - \sqrt{1-H_{AT}}\right)^2} - \frac{6 \cdot \left(1 - \sqrt{1-H_{AT}}\right)^2}{\left(2 - \sqrt{1-H_{AT}}\right)^2} \quad \text{[Eqn. 13]}$$

$$= \frac{4 \cdot \left(1 - \sqrt{1-H_{AT}}\right) - 6 \cdot \left(1 - \sqrt{1-H_{AT}}\right)^2}{\left(2 - \sqrt{1-H_{AT}}\right)^2}$$

$$= \frac{\left(1 - \sqrt{1-H_{AT}}\right) \cdot \left(6 \cdot \sqrt{1-H_{AT}} - 2\right)}{\left(2 - \sqrt{1-H_{AT}}\right)^2}$$

Step 3. Number of effective channels per sector according to handoff rate

The number of effective channels and the effective channel rate are calculated in terms of either the soft handoff channel rate, $H_{CT}$, or the ratio of the soft handoff area to the total service area, $H_{AT}$. The calculated number of effective channels or effective channel rate can then be used to calculate the minimum number of base stations required to accommodate a desired number of users in the network.

Step 3.1 Equation for calculating pole capacity and maximum number of sector channels The pole capacity, $N_{POLE}$, may be defined as the theoretical maximum number of sector channels accommodated in an ideal communication environment. The maximum number of sector channels, $N_{MAX}$, for system loading may be defined as follows:

$$N_{POLE} = F_r \cdot E_s \cdot \left(\frac{1}{\upsilon} \cdot \frac{W/R_b}{E_b/N_o} + 1\right)$$

$$N_{MAX} = N_{POLE} \cdot X_{LOADING}$$

Step 3.2 Number of effective channels per sector according to soft handoff channel rate A call with 'No handoff' status is regarded as a call of one sector or base station, however, a call with '2-way' handoff status occupies channels of two base stations simultaneously. Therefore, only half of the call can be regarded as belonging to each base station. Similarly, a call with '3-way' handoff status is divided such that one-third belongs to each base station, respectively. The number of effective channels may then be calculated the number of calls that each base station or sector holds.

The number of effective channels (i.e., effective channel rate) which in turn is related to the handoff channel rate, which is either assumed or defined in accordance with network design or optimization, can be represented as Eqn. 14 and Eqn. 15, respectively.

$$N_{EFFECTIVE} = N_{MAX} \cdot ((1-H_{CT}) + H_{C2} + H_{C3}) \quad \text{[Eqn. 14]}$$

$$R_{CH-EFFECTIVE} = (1-H_{CT}) + H_{C2}/2 + H_{C3}/3 \quad \text{[Eqn. 15]}$$

Step 3.3 Number of effective channels and effective channel rate according to the ratio of the soft handoff area to the total service area The soft handoff rate $H_{CT}$ may be calculated using the ratio of soft handoff area to total service area $H_{AT}$. A preferred method to convert this ratio $H_{AT}$ into the handoff channel rate $H_{CT}$ is to use the above Eqn. 10. From Eqn. 10 the number of effective channels $N_{EFFECTIVE}$ and the effective channel rate $R_{CH-EFFECTIVE}$ may then be calculated using Eqn. 14 and Eqn. 15.

By substituting Eqns. 10, 12 and 13 into Eqn. 15 and setting a variable, then the effective channel rate $R_{CH-EFFECTIVE}$ can be represented as follows $K=\sqrt{1-H_{AT}}$, $$R_{CH-EFFECTIVE} = [(1-4\cdot(1-K)/(2-K)^2) + ((1-K)\cdot(6\cdot K-2)/(2-K)^2)/2 + (6\cdot(1-K)^2/(2-K)^2)/3]$$

$$= (2-K)^2 - 4\cdot(1-K) + (1-K)\cdot(3\cdot K-1) + 2\cdot(1-K)^2/(2-K)^2$$

$$= 1/(2-K)^2$$

If $K=\sqrt{1-H_{AT}}$ is substituted into the equation above, it is derived as the following Eqn. 16 and Eqn. 17.

$$N_{EFFECTIVE} = N_{MAX} \cdot 1/(2-\sqrt{1-H_{AT}})^2 \quad \text{[Eqn. 16]}$$

$$R_{CH-EFFECTIVE} = 1/(2-\sqrt{1-H_{AT}})^2 \quad \text{[Eqn. 17]}.$$

Figure 5:
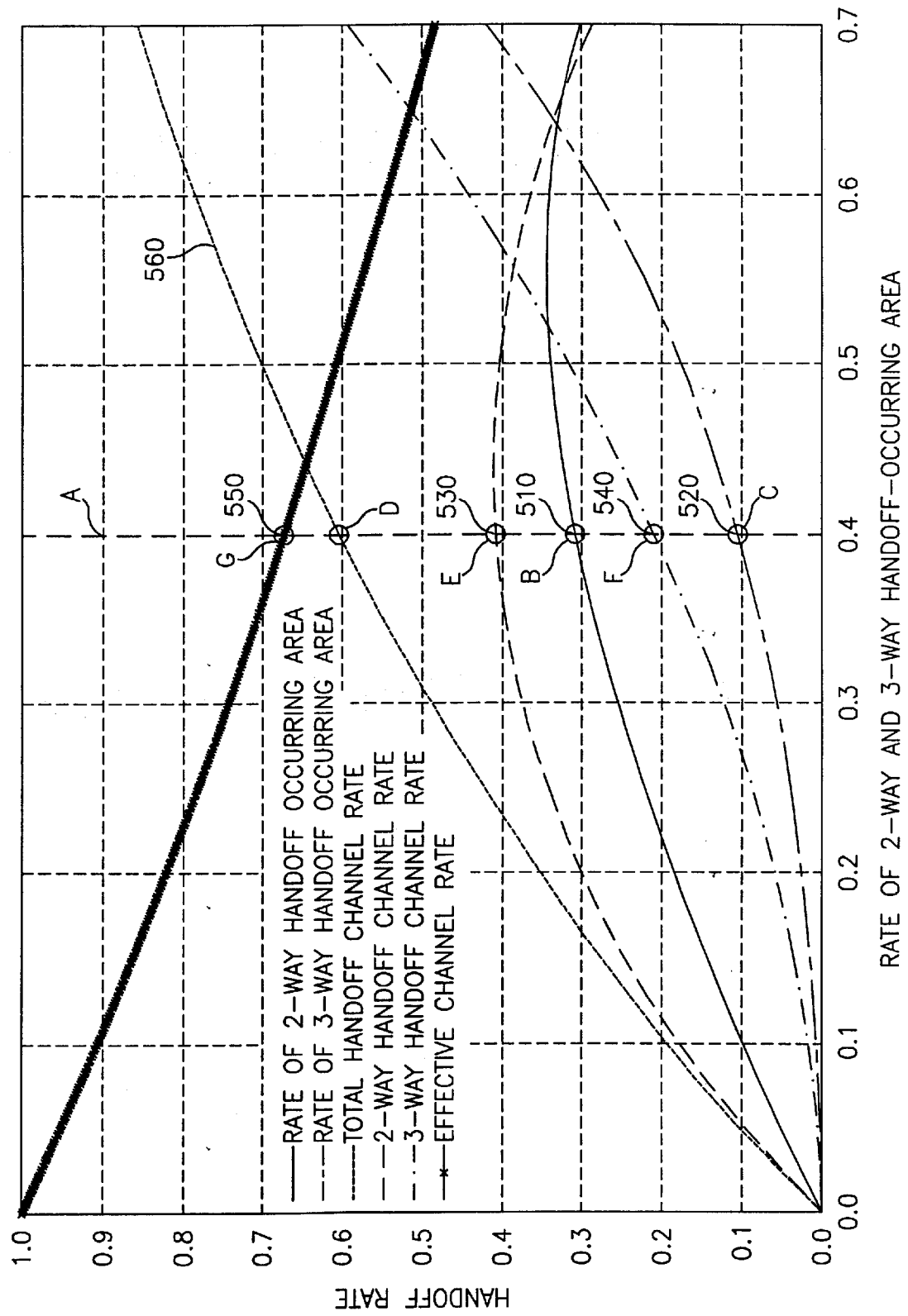
FIG. 5 is a table illustrating handoff rates with changing soft handoff channel rate from 0 to 0.7 in accordance with an embodiment of the present invention.

FIG. 5 shows a graph illustrating the soft handoff channel rate as the ratio of soft handoff area to total service area varies from 0 to 0.7.

The example demonstrates that when the ratio of soft hand off area to total service area is 40% (shown at A), the soft handoff channel rate is 60% (shown at D on curve 560). Accordingly, if the soft handoff channel rate of 60% is adopted during network design, then a corresponding ratio of soft handoff area to total service area of 40% is required. In this example, the 2-way soft handoff area (shown at curve 510) needs to be 29.8% (shown at B) of the total service area and the 3-way soft handoff area (shown at curve 520) needs to be 10.2% (shown at C) of the total service area of the network.

Using the method above, from the ratio of soft handoff area to total service area of 40% (A) can be calculated the handoff channel rate of 60% (D), the 2-way handoff channel rate (shown at curve 530) of 39.7% (E), the 3-way handoff channel rate (shown at curve 540) of 20.3% (F), and the effective channel rate (shown at curve 550), which is 66.6% (G). If it is then assumed that the maximum number of available channels per sector is 30, then the number of effective channels is about 20 such at.

When the ratio of soft handoff area to total service area is approximately 0.436 it can be observed that the effective channel rate (shown at curve 550) corresponds to the soft handoff channel rate (shown at curve 560). If a CDMA network is implemented with a ratio of soft handoff area to total service area that exceeds 0.463 then the soft hand off channel rate will exceed the effective channel rate. If this occurs, the network is devoting more resources to performing soft handoffs than it is to handling calls. Accordingly, a preferred embodiment is a CDMA network with a ratio of soft handoff area to total service to total service area that is in the range of 0.2 to 0.4, more preferably between 0.3 and 0.4.

The second embodiment relates to a method of designing a CDMA network using the above calculation. Such a design process may utilize the following steps: determining the area that the CDMA network is intended to service; selecting a base station for use in the CDMA network and a transmission power for each base station; calculating values for the radii R, C and D from the transmission power of each base station and predetermined network parameters; calculating the number of base stations required for the network from said area and radii; calculating and determining values for $N_{EFFECTIVE}$, $R_{CH-EFFECTIVE}$, $H_{AT}$ and $H_{CT}$ for the CDMA network; if the values for $N_{EFFECTIVE}$, $R_{CH-EFFECTIVE}$, $H_{AT}$ and $H_{CT}$ are acceptable then stop the design process; otherwise, adjusting at least one of: the placement of the base stations, the transmission power, and the network parameters, and returning to the step of calculating and determining values for $N_{EFFECTIVE}$, $R_{CH\text{-}EFFECTIVE}$, $H_{AT}$ and $H_{CT}$.

Further, the adjustment can be performed using the steps of: choosing an acceptable value for at least one of $N_{EFFECTIVE}$, $R_{CH\text{-}EFFECTIVE}$, $H_{AT}$ and $H_{CT}$; calculating values for any of $N_{EFFECTIVE}$, $R_{CH\text{-}EFFECTIVE}$, $H_{AT}$ and $H_{CT}$ that values were not chosen for; if said values for $N_{EFFECTIVE}$ $R_{CH\text{-}EFFECTIVE}$, $H_{AT}$ and $H_{CT}$ are not acceptable, returning to said step of choosing an acceptable value; otherwise calculating a values for the radii R, C and D to satisfy the values for $N_{EFFECTIVE}$ $R_{CH\text{-}EFFECTIVE}$, $H_{AT}$ and $H_{CT}$; and adjusting at least one of: the placement of the base stations, the transmission power of the base stations, the network parameters.

An alternate method for designing a CDMA network commences with selecting a preferred value for the ratio of the soft hand off area to the total service area or the effective number of channels from FIG. 5. The process then proceeds by selecting the corresponding values for 3-way and 2-way soft handoff channel rates and the 3-way and 2-way ratio of soft hand off area to total service area.

Once these parameters are determined, then they form input to the above equations, from where values of R, D and C can be determined. Based on these values of R, D and C the density of base stations for a network can be determined and the power transmission levels for each base station can be determined.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. In a code division multiple access (CDMA) digital mobile communication system, a method for determining a number of effective channels and an effective channel rate comprising the steps of:

(a) calculating the ratio of soft handoff area to total service area;

(b) calculating a soft handoff channel rate as a function of said ratio of the soft handoff area to the total service area; and (c) calculating a number of effective channels, $N_{EFFECTIVE}$, and an effective channel rate, $R_{CH\text{-}EFFECTIVE}$ as a function of said ratio of the soft handoff area to the total service area and said soft handoff channel rate.

2. A method for determining a number of effective channels and an effective channel rate as claimed in claim 1, wherein said ratio of soft handoff area to total service area, $H_{AT}$ is related to a radius difference, $\Delta R$ and D, a radius of coverage, where said relation is defined as $\Delta R = D \cdot (1 - \sqrt{1-H_{AT}})$, where $0 \leq H_{AT} \leq 1$, that a corresponding sector can service with the best signal quality.

3. A method for determining a number of effective channels and an effective channel rate as claimed in claim 2, wherein said radius difference $\Delta R$, is a radius difference between one of R and D and C and D, where C is a radius of coverage that only said corresponding sector can service and R is a cell radius.

4. The method as set forth in claim 2, wherein said number of effective channels, $N_{EFFECTIVE}$ is calculated as $$N_{EFFECTIVE} = N_{MAX} \cdot \frac{1}{\left(2 - \sqrt{1-H_{AT}}\right)^2}.$$

5. The method as set forth in claim 2, wherein said effective channel rate, $R_{CH\text{-}EFFECTIVE}$ is calculated as a function of $H_{AT}$ as $$R_{CH\text{-}EFFECTIVE} = \frac{1}{\left(2 - \sqrt{1-H_{AT}}\right)^2}.$$

6. A method for determining a number of effective channels and an effective channel ratio as claimed in claim 1, wherein said rate of soft handoff area to the total service area, $H_{AT}$ is calculated as a sum of $H_{A3}$ and $H_{A2}$, where $H_{A3}$ is a rate of a 3-way soft handoff area to the total service area, and $H_{A2}$ is the ratio of a 2-way soft handoff area to the total service area.

7. The method as set forth in claim 6, wherein $H_{A3}$ is calculated as $H_{A3} = 2 \cdot (1-\sqrt{1-H_{AT}})^2$.

8. The method as set forth in claim 6, wherein $H_{A2}$ is calculated as $H_{A2} = H_{AT} - 2 \cdot (1-\sqrt{1-H_{AT}})^2$.

9. The method as set forth in claim 8, wherein said $H_{CT}$ is calculated as the sum of $H_{C3}$ and $H_{C2}$, where said $H_{C3}$ is a ratio of 3-way handoff area to total service area, and $H_{C2}$ is a ratio of 2-way handoff area to total service area.

10. The method as set forth in claim 9, wherein said 3-way handoff channel rate, $H_{C3}$ is calculated as a function of $\Delta R$ and D as $H_{C3} = 6 \cdot (\Delta R)^2/(D+\Delta R)^2$.

11. The method as set forth in claim 9, wherein said 3-way handoff channel rate, $H_{C3}$ is calculated as $$H_{C3} = \frac{6 \cdot \left(1-\sqrt{1-H_{AT}}\right)^2}{\left(2-\sqrt{1-H_{AT}}\right)^2}.$$

12. The method as set forth in claim 9, wherein said 2-way handoff channel rate $H_{C2}$ is calculated as $$H_{C2} = \frac{\left(1-\sqrt{1-H_{AT}}\right) \cdot \left(6 \cdot \sqrt{1-H_{AT}} - 2\right)}{\left(2-\sqrt{1-H_{AT}}\right)^2}.$$

13. The method as set forth in claim 9, wherein an effective channel rate, $R_{CH\text{-}EFFECTIVE}$ is calculated as $$R_{CH\text{-}EFFECTIVE} = (1-H_{CT}) + H_{C2}/2 + H_{C3}/3.$$

14. The method as set forth in claim 1, wherein said soft handoff channel rate is calculated as $$H_{CT} = \frac{4 \cdot \left(1-\sqrt{1-H_{AT}}\right)}{\left(2-\sqrt{1-H_{AT}}\right)^2}.$$

15. The method as set forth in claim 1, wherein the number of effective channels, $N_{EFFECTIVE}$ is calculated as $N_{EFFECTIVE} = N_{MAX} \cdot ((1-H_{CT}) + H_{C2}/2 + H_{C3}/3)$, where:
   $N_{MAX}$ is a maximum number of channels for a CDMA network in accordance with predefined network parameters.

16. A method for designing a CDMA network using calculation of capacity variation and effective channel rate per sector in connection with soft handoff rate comprising the steps of:

calculating a number of effective channels, $N_{EFFECTIVE}$ as: $N_{EFFECTIVE}=N_{MAX} \cdot ((1-H_{CT})+H_{C2}/2+H_{C3}/3)$, where $N_{MAX}$ is the maximum number of channels at a system loading environment defined in a practical system design, $H_{CT}$ is handoff channel rate, $H_{C2}$ is 2-way handoff channel rate among total service area and $H_{C3}$ is 3-way handoff channel rate among total service area;

calculating the effective channel rate, $R_{CH-EFFECTIVE}$ in away of $R_{CH-EFFECTIVE}=(1-H_{CT})+H_{C2}/2+H_{C3}/3$.

17. A method for determining a number of effective channels and an effective channel rate using a calculation of capacity variation and effective channel rate per sector in connection with soft handoff rate comprising the steps of:

calculating the number of effective channels, $N_{EFFECTIVE}$ as $$N_{EFFECTIVE} = N_{MAX} \cdot \frac{1}{\left(2-\sqrt{1-H_{AT}}\right)^2},$$

$N_{MAX}$ is the maximum number of channels at a system loading environment defined in a practical system design, $N_{MAX}$ $H_{AT}$ is ratio of the soft handoff area to the total service area; and calculating the effective channel rate, $R_{CH-EFFECTIVE}$ in connection with $$R_{CH-EFFECTIVE} = \frac{1}{\left(2-\sqrt{1-H_{AT}}\right)^2}.$$

18. The method as set forth in claim 17, wherein $H_{AT}$ is calculated as the sum of $H_{A3}$ and $H_{A2}$ where $H_{A3}$ is the ratio of the 3-way soft handoff area to the total service area, and $H_{A2}$ is the ratio of the 2-way soft handoff area to the total service area.

19. The method as set forth in claim 18, wherein said $H_{AT}$ is related to ΔR and D wherein R is a cell radius, D is a radius of coverage that the corresponding sector can service with the best signal quality, C is a radius of coverage that only said corresponding sector can service and ΔR is a radius-difference between one of R and D and C and D satisfying $0 \leq R \leq D$.

20. A method for designing a CDMA network, comprising the steps of:

(i) determining an area that the CDMA network is intended to service;

(ii) placing a base station in said determined area;

(iii) selecting a transmission power for said base station;

(iv) calculating radius values R, C and D for said base station using said selected transmission power and predetermined network parameters;

(v) calculating a required number of base stations for the network from said determined area and radius values R, C and D;

(vi) calculating values for $N_{EFFECTIVE}$, $R_{CH-EFFECTIVE}$, $H_{AT}$ and $H_{CT}$ for the CDMA network;

(vii) determining whether said calculated values for $N_{EFFECTIVE}$, $_{RCH-EFFECTIVE}$, $H_{AT}$ and H satisfy target values established at an initial set-up time;

(viii) terminating when said calculated values for $N_{EFFECTIVE}$, $R_{CH-EFFECTIVE}$, $H_{AT}$, and $H_{CT}$ satisfy the target values; and (xi) adjusting at least one of: the placement of the required base stations for the CDMA network, the transmission power, and the network parameters, and returning to step (vi).

21. The method as set forth in claim 20, wherein said method following said step (viii) and prior to step (ix) further comprises the steps of:

(i) choosing a value for at least one of $N_{EFFECTIVE}$, $R_{CH-EFFECTIVE}$, $H_{AT}$ and $H_{CT}$ that satisfy the target values established at an initial set-up time;

(ii) calculating a respective value for each one of $N_{EFFECTIVE}$, $R_{CH-EFFECTIVE}$, $H_{AT}$ and $h_{CT}$ that was chosen in said choosing step;

(iii) if said calculated values for $N_{EFFECTIVE}$, $R_{CH-EFFECTIVE}$, $H_{AT}$ and $H_{CT}$ do not satisfy the target values established at said initial set-up time, returning to step (i); otherwise (iv) calculating radius values R, C and D which satisfy values of $N_{EFFECTIVE}$, $R_{CH-EFFECTIVE}$, $H_{AT}$ and $H_{CT}$.

* * * * *